(12) United States Patent
Patton et al.

(10) Patent No.: US 10,382,938 B1
(45) Date of Patent: Aug. 13, 2019

(54) DETECTING AND VALIDATING PLANNED EVENT INFORMATION

(71) Applicant: Banjo, Inc., Park City, UT (US)

(72) Inventors: Damien Patton, Park City, UT (US); Joshua J. Newman, Park City, UT (US); Tilmann Bruckhaus, Redwood City, CA (US)

(73) Assignee: Banjo, Inc., Park City, UT (US)

( * ) Notice: Subject to any disclaimer, the term of this patent is extended or adjusted under 35 U.S.C. 154(b) by 0 days.

(21) Appl. No.: 16/238,782

(22) Filed: Jan. 3, 2019

Related U.S. Application Data

(63) Continuation of application No. 16/121,917, filed on Sep. 5, 2018, now Pat. No. 10,212,572.

(60) Provisional application No. 62/628,866, filed on Feb. 9, 2018, provisional application No. 62/654,274, filed on Apr. 6, 2018, provisional application No. 62/654,277, filed on Apr. 6, 2018, provisional application No. 62/657,708, filed on Apr. 13, 2018, provisional application No. 62/664,001, filed on Apr. 27, 2018, provisional application No. 62/678,257, filed on May 30, 2018, provisional application No. 62/682,176, filed on Jun. 8, 2018, provisional application No. 62/682,177, filed on Jun. 8, 2018, provisional application No. 62/685,290, filed on Jun. 15, 2018.

(51) Int. Cl.
| | | |
|---|---|---|
| *H04W 4/00* | (2018.01) | |
| *H04W 4/90* | (2018.01) | |
| *G06F 9/54* | (2006.01) | |
| *H04W 4/021* | (2018.01) | |
| *G06F 16/29* | (2019.01) | |
| *G06N 20/00* | (2019.01) | |

(52) U.S. Cl.
CPC ............ *H04W 4/90* (2018.02); *G06F 9/542* (2013.01); *G06F 16/29* (2019.01); *G06N 20/00* (2019.01); *H04W 4/021* (2013.01)

(58) Field of Classification Search
CPC ........ H04W 4/90; H04W 4/021; G06N 20/00; G06F 16/29; G06F 9/542
See application file for complete search history.

(56) References Cited

U.S. PATENT DOCUMENTS

| | | | | |
|---|---|---|---|---|
| 10,212,572 B1* | 2/2019 | Patton | ............. | H04W 4/90 |
| 2014/0304262 A1* | 10/2014 | Makki | ............. | G06F 16/95 |
| | | | | 707/736 |
| 2015/0019537 A1* | 1/2015 | Neels | ............. | G06F 16/338 |
| | | | | 707/722 |
| 2015/0220835 A1* | 8/2015 | Wilson | ............. | H04W 4/21 |
| | | | | 706/46 |

(Continued)

*Primary Examiner* — Walli Z Butt
(74) *Attorney, Agent, or Firm* — Michael B. Dodd; R. Jace Hirschi

(57) ABSTRACT

The present invention extends to methods, systems, and computer program products for detecting and validating planned event information. A plurality of normalized signals is accessed. Planned event data across the plurality of normalized signals is checked for inconsistencies. Any inconsistencies are resolved in an automated fashion, for example, through reference to databases containing additional information. A planned event can be detected/validated from concurring and/or resolved planned event data. A validator can refer to an event history database and/or a planning system to validate a possible planned event as an actual planned event.

20 Claims, 11 Drawing Sheets

(56) References Cited

U.S. PATENT DOCUMENTS

2015/0234570 A1\* 8/2015 Hampson ............... G06Q 50/01
715/753
2018/0097762 A1\* 4/2018 Garcia .................... H04L 51/20

\* cited by examiner

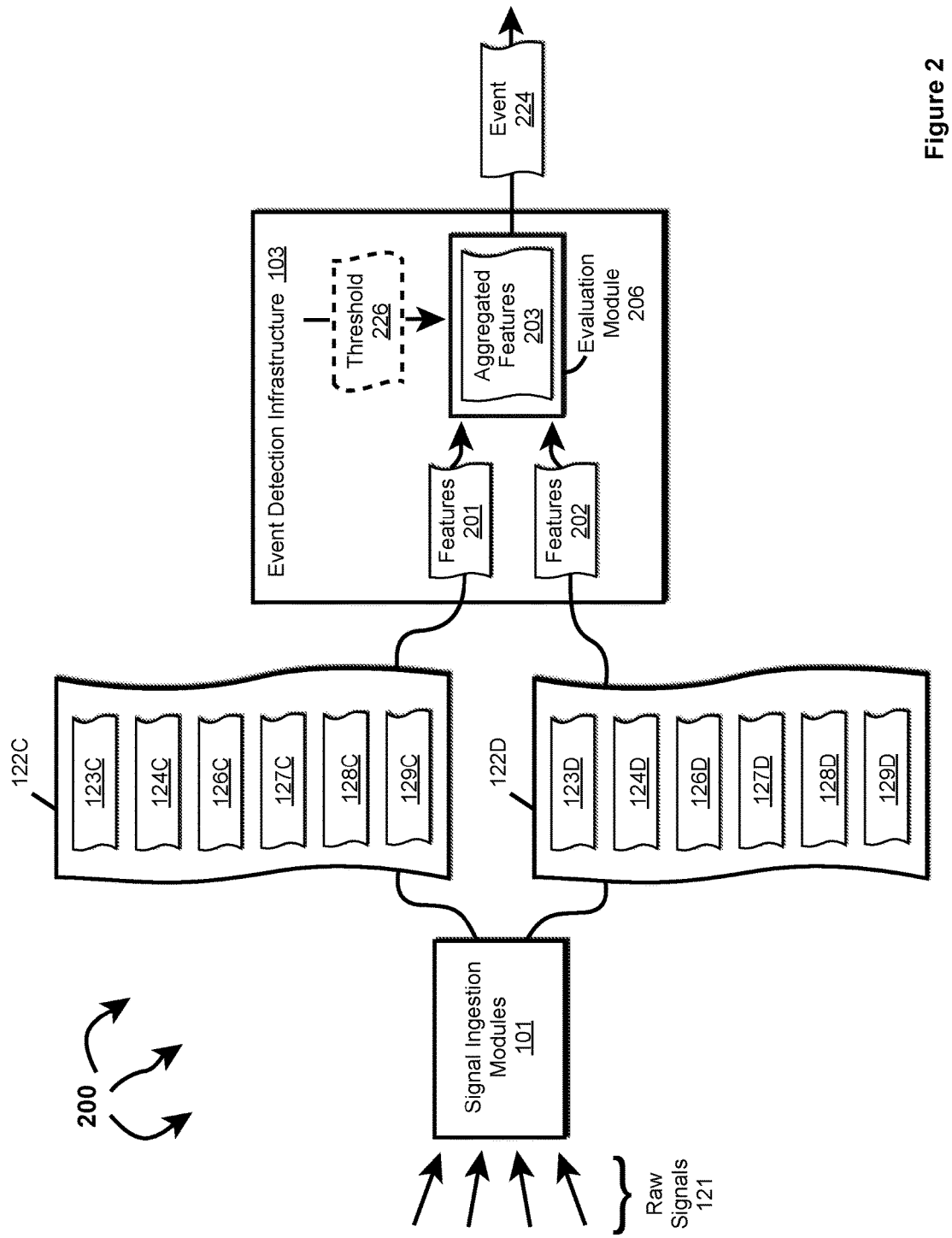

DETECTING AND VALIDATING PLANNED EVENT INFORMATION

CROSS-REFERENCE TO RELATED APPLICATIONS

This application is a continuation of U.S. patent application Ser. No. 16/121,917, entitled "Detecting And Validating Planned Event Information", filed Sep. 5, 2018 which is incorporated herein in its entirety.

This application claims the benefit of U.S. Provisional Patent Application Ser. No. 62/628,866, entitled "Multi Source Validation", filed Feb. 9, 2018 which is incorporated herein in its entirety. This application claims the benefit of U.S. Provisional Patent Application Ser. No. 62/654,274, entitled "Detecting Events From Multiple Signals", filed Apr. 6, 2018 which is incorporated herein in its entirety. This application claims the benefit of U.S. Provisional Patent Application Ser. No. 62/654,277 entitled, "Validating Possible Events With Additional Signals", filed Apr. 6, 2018 which is incorporated herein in its entirety. This application claims the benefit of U.S. Provisional Patent Application Ser. No. 62/657,708, entitled "Validating Planned Events", filed Apr. 13, 2018, which is incorporated herein in its entirety. This application claims the benefit of U.S. Provisional Patent Application Ser. No. 62/664,001, entitled, "Normalizing Different Types Of Ingested Signals Into A Common Format", filed Apr. 27, 2018, which is incorporated herein in its entirety. This application claims the benefit of U.S. Provisional Patent Application Ser. No. 62/678,257, entitled "Detecting And Validating Planned Event Information", filed May 30, 2018, which is incorporated herein in its entirety. This application claims the benefit of U.S. Provisional Patent Application Ser. No. 62/682,176 entitled "Detecting An Event From Multiple Sources", filed Jun. 8, 2018 which is incorporated herein in its entirety. This application claims the benefit of U.S. Provisional Patent Application Ser. No. 62/682,177 entitled "Detecting An Event From Multi-Source Event Probability", filed Jun. 8, 2018 which is incorporated herein in its entirety. This application claims the benefit of U.S. Provisional Patent Application Ser. No. 62/685,290 entitled "Detecting And Validating Planned Event Information", filed Jun. 15, 2018, which is incorporated herein in its entirety.

BACKGROUND

1. Background and Relevant Art

Data provided to computer systems can come from any number of different sources, such as, for example, user input, files, databases, applications, sensors, social media systems, cameras, emergency communications, etc. In some environments, computer systems receive (potentially large volumes of) data from a variety of different domains and/or verticals in a variety of different formats. When data is received from different sources and/or in different formats, it can be difficult to efficiently and effectively derive intelligence from the data.

Many entities desire to be made aware of planned events (e.g., concerts, sporting events, theatre performances, etc.) as well as changes to those planned events. Entities often refer to the Internet, for example, to event information websites, to locate information about planned events. However, different websites may indicate different information about a planned event, including start time, end time, venue, location, etc. Further, the circumstances of a planned event can change leading to other inconsistencies between event information websites.

Some events may be associated with an authoritative web set. For example, professional sports teams typically have their own "official" website and/or an "official" league website indicating when and where games are to be played. However, information aggregation websites and other meta websites often take the information from "official" sites and repurpose it. People use such sites to more efficiently access information for multiple events. For example, if a person is interested in all the sporting activities in their area, it may be more efficient to visit an information aggregation website than individually check multiple team and/or league websites. Unfortunately, each time information is obtained and repurposed there is some chance of information loss and/or contextual loss.

Further, due to unforeseen circumstances, the date and/or time of planned events can change, the location of planned events can change, planned events can be canceled, etc. Unforeseen circumstances can include natural disasters, venue issues (e.g., technical, legal, etc.), talent issues (e.g., illness, legal, etc.), other overriding events (e.g., visiting dignitaries), etc. When a planned event is changed, changes may be initially posted at an "official" website. However, it may take some amount of time for changed information posted to "official" web sites to propagate through to aggregation websites and other meta websites. Further, different aggregation websites and other meta websites may acquire and/or update changed information at different times. Thus, at any given time, there can be inconsistencies in planned event information available online.

BRIEF SUMMARY

Examples extend to methods, systems, and computer program products for detecting and validating planned event information.

In one aspect, a normalized signal is received. A possible planned event in an event category is detected based on characteristics of the normalized signal. A location of the possible planned event is derived. An event history of one or more prior events at the location is accessed.

An event context is derived from the characteristics of the normalized signal and the contents of the event history. The event context is submitted to a planning system potentially associated with a planned event at the location. Validating data is received from the planning system. The possible planned event is validated as the planned event from the validating data.

In another aspect, first planned event data is acquired from a first website. The first planned event data includes a first date, a first start time, a first end time, and a first location. Second planned event data is acquired from a second website. The second planned event data includes a second date, a second start time, a second end time, and a second location. It is determined if the first planned event data and the second planned event data concur with respect to planned event details. When the first planned event data and the second planned event data concur, an entity is notified of the details of the planned event.

On the other hand, an inconsistency may be identified between one or more of: the first date and the second date, the first start time and the second start time, the first end time and the second end time, or the first location and the second location. When an inconsistency is identified, the inconsistency is automatically resolved into consistent details of a planned event. An entity is notified of the consistent details of the planned event.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which:

FIG. 2 illustrates an example computer architecture that facilitates detecting an event from features derived from multiple signals.

DETAILED DESCRIPTION

Figure 1A:
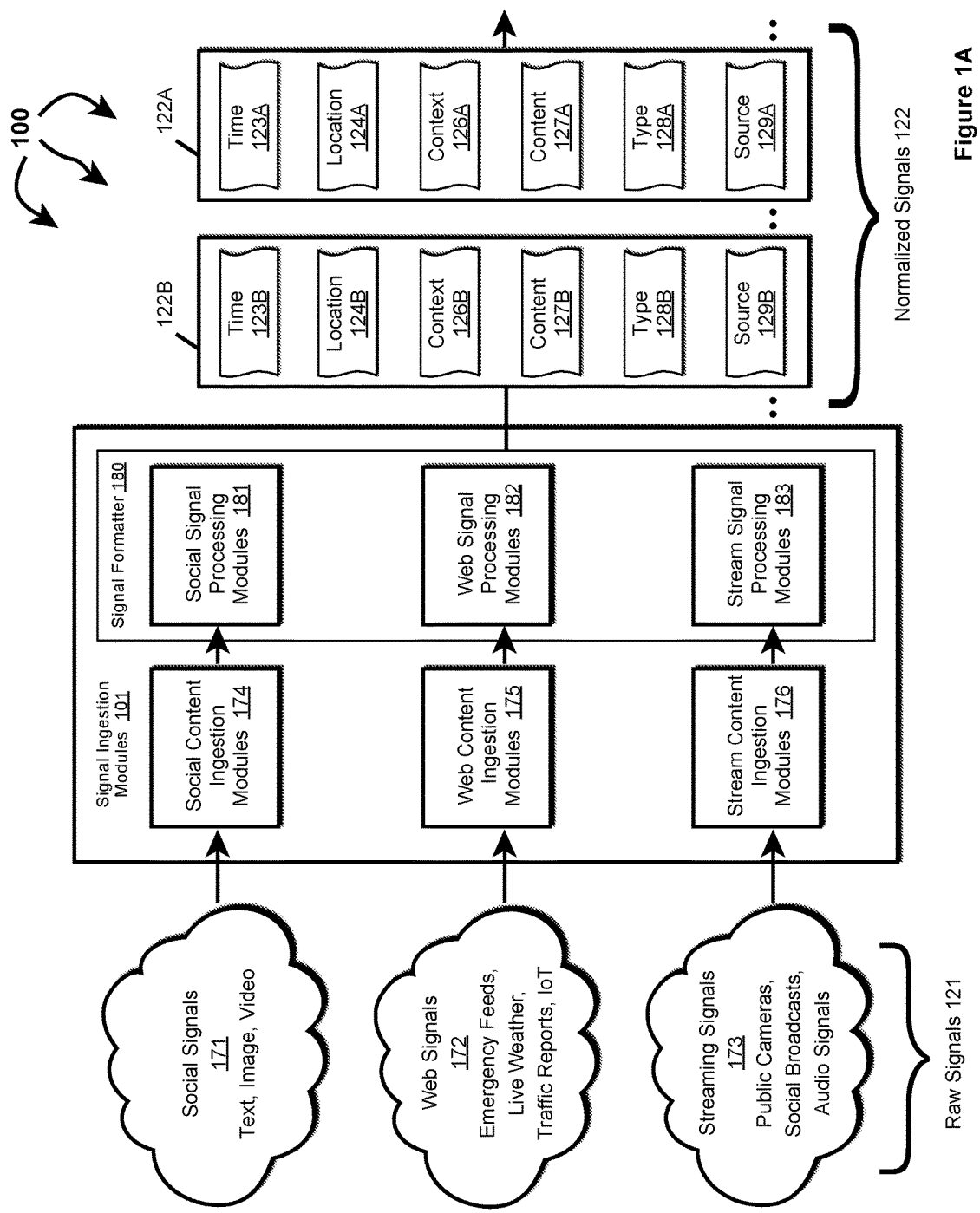
FIG. 1A illustrates an example computer architecture that facilitates normalizing ingesting signals.

Examples extend to methods, systems, and computer program products for detecting and validating planned event information.

Entities (e.g., parents, other family members, guardians, friends, teachers, social workers, first responders, hospitals, delivery services, media outlets, government entities, etc.) may desire to be made aware of planned events and changes to planned events. Different types of ingested signals (e.g., social media signals, web signals, and streaming signals) can be used to detect events. Entities may desire to be made aware of changes to relevant events as close as possible to the changes' occurrence (i.e., as close as possible to "moment zero").

In general, signal ingestion modules ingest different types of raw structured and/or raw unstructured signals on an ongoing basis. Different types of signals can include different data media types and different data formats, including Web signals. Different types of signals can include different data media types and different data formats. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a signal. Different ingestion modules can be utilized/tailored to determine T, L, and C dimensions associated with different signal types. Normalized (or "TLC") signals can be forwarded to an event detection infrastructure.

When signals are normalized across common dimensions subsequent event detection is more efficient and more effective.

Normalization of ingestion signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Thus, each normalized signal can include a T vector, an L vector, and a C vector. At lower dimensionality, the complexity of measuring "distances" between dimensional vectors across different normalized signals is reduced.

Concurrently with signal ingestion, an event detection infrastructure considers features of different combinations of normalized signals to attempt to identify events of interest to various parties. For example, the event detection infrastructure can determine that features of multiple different normalized signals collectively indicate an event of interest to one or more parties. Alternately, the event detection infrastructure can determine that features of one or more normalized signals indicate a possible event of interest to one or more parties. The event detection infrastructure then determines that features of one or more other normalized signals validate the possible event as an actual event of interest to the one or more parties. The event infrastructure can similarly detect changes to events, including changes to planned events. Signal features can include: signal type, signal source, signal content, Time (T) dimension, Location (L) dimension, Context (C) dimension, other circumstances of signal creation, etc. In one aspect, the event detection infrastructure receives a normalized (e.g., Web) signal from the signal ingestion modules. The event detection infrastructure detects a possible planned event based on characteristics of the normalized signal. The event detection infrastructure derives event features associated with the possible planned event, including an event location, an event date, and event times. An event history of one or more prior events at the event location can also be accessed. Signals can expressly include one or more event features. One or more other event features can be inferred via a combination of historical datasets, machine learning, and heuristics.

An event context is derived from the characteristics of the normalized signal and the contents of the event history. The event context is submitted to a planning system potentially associated with a planned event at the event location. Validating data is received from the planning system. The possible planned event is validated as the planned event based on the validating data.

In another aspect, the event detection infrastructure receives a plurality of normalized (e.g., Web) signals providing details of a planned event. Each signal can be from a different source. Automated mechanisms (e.g., machine learning, artificial intelligence, neural networks, etc.) can be used to determine truthful information related to the planned event. In one aspect, multiple sources (e.g., multiple websites) provide consistent (e.g., substantively concurring) event information associated with a planned event. That is, the multiple sources can indicate essentially the same date, same start time, same end time, same location, same description, etc. for a planned event. In this aspect, machine learning, artificial intelligence, neural networks, etc. can be used to automatically validate event information from the multiple sources with one another.

In further aspect, different sources provide inconsistent (e.g., differing) event information associated with a planned event. That is, one source can indicate one or more categories, a date, a start time, an end time, a location, a description, etc. for a planned event. Another source can indicate one or more other categories, another date, another start time, another end time, another location, another description, etc. for a planned event. Categories can include a type of event (e.g., sporting event, convert, convention, etc.) as well as event participants (e.g., teams, musicians, etc.) At least one of the one or more categories, the dates, the start times, the end times, the locations, and the descriptions can meaningfully differ from one another. Machine learning, artificial intelligence, neural networks, etc. can be used to automatically resolve discrepancies, disagreements, etc. in event information from different sources. Discrepancies, disagreements, etc. not automatically resolved can be forwarded to other resolution systems.

Accordingly, aspects of the invention increase the likelihood of providing accurate event information regarding changes to a planned event to entities interested in the planned event. For example, entities are more likely to receive accurate event information when a planned event is rescheduled, relocated, or canceled.

Surrounding activities (or other events) associated with a planned event can also be monitored and/or detected. Some entities, including first responders, may be interested in surrounding activities. In this respect, one planned event can trigger additional planned events. For example, a concert can trigger a traffic management event for a police department, establishment of medical staging areas event for paramedics, etc. Information about these events can also be provided by one or more sources. Event information about these activities or other events can be provided in a similar automated fashion.

In one aspect, entities register to be automatically notified of changes to relevant planned events. When changes to relevant planned events are detected, the entities are automatically notified.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, partially normalized signals, signal features, single source probabilities, times, time dimensions, locations, location dimensions, context dimensions, geo cells, geo cell entries, geo cell queries, search terms, events, possible events, signal features, planned events, possible planned events, event context, validating data, venues, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, partially normalized signals, signal features, single source probabilities, times, time dimensions, locations, location dimensions, context dimensions, geo cells, geo cell entries, geo cell queries, search terms, events, possible events, signal features, planned events, possible planned events, event context, validating data, venues, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form.

In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various
Geohash Precisions

| Geohash Length/Precision | width × height |
| --- | --- |
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc.

In general, signal normalization can prepare (or preprocess) raw signals into normalized signals to increase efficiency and effectiveness of subsequent computing activities, such as, event detection, event notification, etc., that utilize the normalized signals. For example, signal ingestion modules can normalize raw signals, including raw streaming signals, into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In additional aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) on going basis and in essentially real-time. Signal ingestion module(s) 101 include social content ingestion modules 174, web content ingestion modules 175, stream content ingestion modules 176, and signal formatter 180. Signal formatter 180 further includes social signal processing module 181, web signal processing module 182, and stream signal processing modules 183.

Streaming signals 173 can include live video and/or non-live (previously stored) video.

For each type of signal, a corresponding ingestion module and signal processing module can interoperate to normalize the signal along Time, Location, Context (TLC) dimensions. For example, social content ingestion modules 174 and social signal processing module 181 can interoperate to normalize social signals 171 into TLC dimensions. Similarly, web content ingestion modules 175 and web signal processing module 182 can interoperate to normalize web signals 172 into TLC dimensions. Likewise, stream content ingestion modules 176 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can access "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality of a raw signal to a normalized signal including a T vector, an L vector, and a C vector. At lower dimensionality, the complexity and resource consumption of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time (dimension) 123A, location (dimension) 124A, context (dimension) 126A, content 127A, type 128A, and source 129A to event detection infrastructure 103. Similarly, signal ingestion modules 101 can send normalized signal 122B, including time (dimension) 123B, location (dimension) 124B, context (dimension) 126B, content 127B, type 128B, and source 129B to event detection infrastructure 103.

Event Detection

Figure 1B:
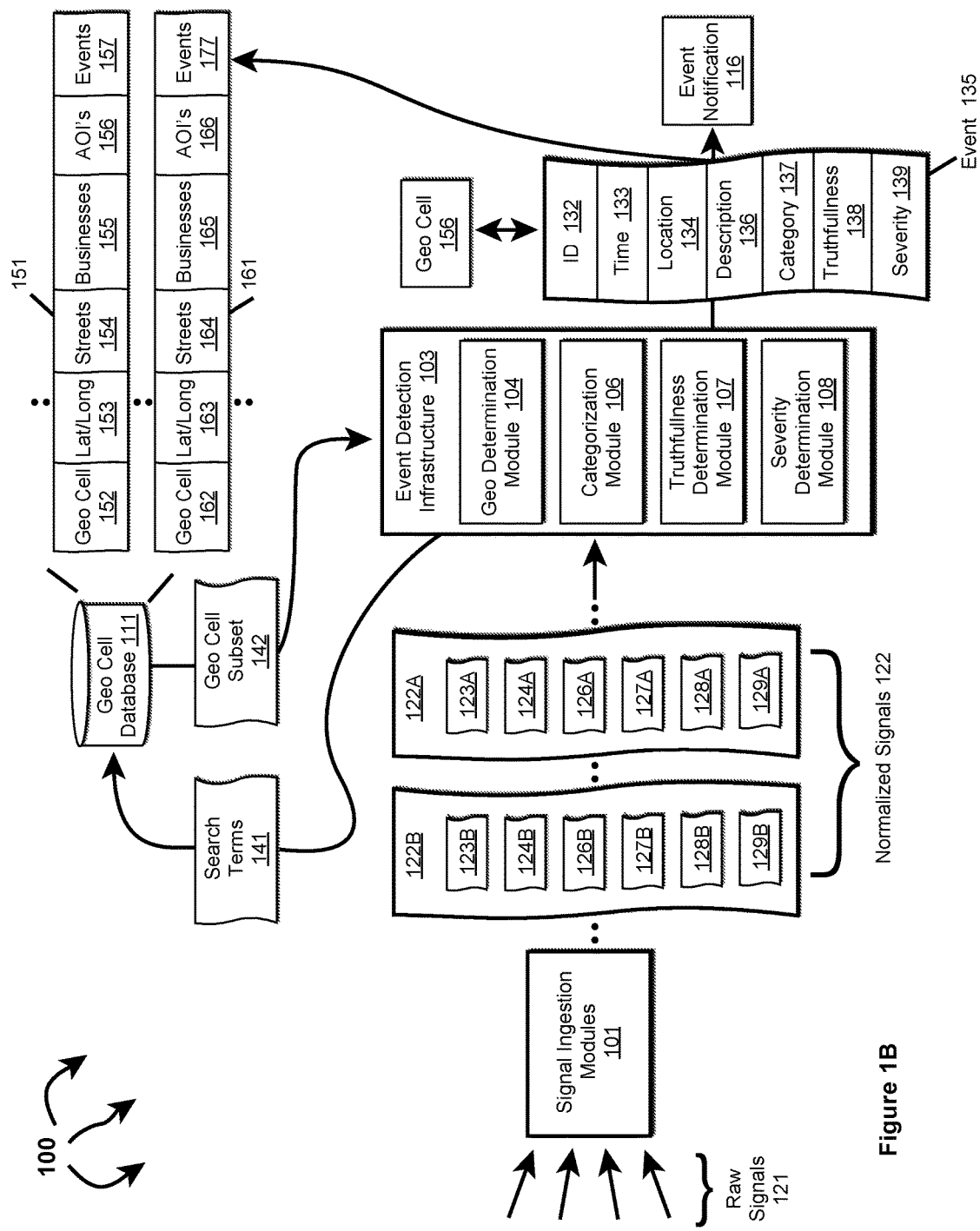
FIG. 1B illustrates an example computer architecture that facilitates detecting events from normalized signals.

FIG. 1B depicts part of computer architecture 100 that facilitates detecting events. As depicted, computer architecture 100 includes geo cell database 111 and even notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Event detection infrastructure can likewise detect changes to existing (planned and unplanned) events. Since, normalized signals are normalized to include Time, Location, and Context dimensions (vectors), event detection infrastructure 103 can handle normalized signals in a more uniform manner. Handling signals in a more uniform manner increases event detection and event change detection efficiency and effectiveness and also reduces resource consumption. For example, Time, Location, and Context vectors of different normalized signals can be compared (instead of comparing along numerous other dimensions).

Event detection infrastructure 103 can also determine an event truthfulness (e.g., erroneous detection results, detections based on tampered source data, detections of fictional or staged events), event severity, and an associated geo cell. In one aspect, context information in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension and/or can be represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension and/or can be represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field). Sufficiently precise geo cells can be used to increase the practicality of storing matching content.

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135.

Event Detection and Validation

FIG. 2 illustrates an example computer architecture 200 that facilitates detecting an event from features derived from multiple signals. As depicted, computer architecture 200 further includes event detection infrastructure 103. Event infrastructure 103 can be connected to (or be part of) a network with signal ingestion modules 101. As such, signal ingestion modules 101 and event detection infrastructure 103 can create and exchange message related data over the network.

As depicted, event detection infrastructure 103 further includes evaluation module 206. Evaluation module 206 is configured to determine if features of a plurality of normalized signals collectively indicate an event. Evaluation module 206 can detect (or not detect) an event based on one or more features (e.g., dimensions) of one normalized signal in combination with one or more features (e.g., dimensions) of another normalized signal. Features (e.g., dimensions) of normalized signals can be compared and/or aggregated to derive similarity (or dissimilarity) between normalized signals, to detect events, and to detect event changes.

Figure 3:
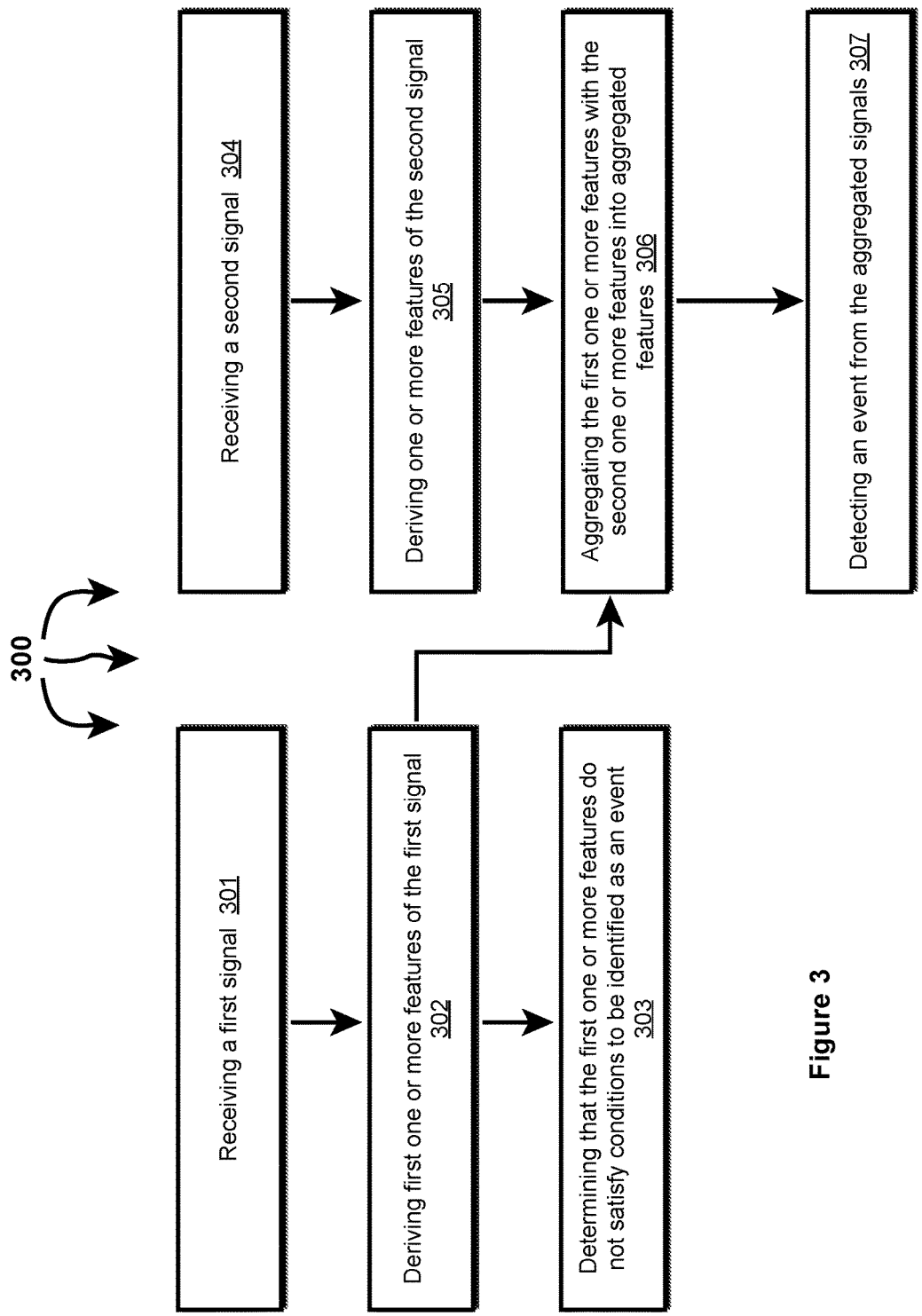
FIG. 3 illustrates a flow chart of an example method for detecting an event from features derived from multiple signals.

FIG. 3 illustrates a flow chart of an example method 300 for detecting an event from features derived from multiple signals. Method 300 will be described with respect to the components and data in computer architecture 200.

Method 300 includes receiving a first signal (301). For example, event detection infrastructure 103 can receive normalized signal 122B. Method 300 includes deriving first one or more features of the first signal (302). For example, event detection infrastructure 103 can derive features 201 of normalized signal 122B. Features 201 can include and/or be derived from time 123B, location 124B, context 126B, content 127B, type 128B, and source 129B. Event detection infrastructure 103 can also derive features 201 from one or more single source probabilities assigned to normalized signal 122B.

Method 300 includes determining that the first one or more features do not satisfy conditions to be identified as an event (303). For example, evaluation module 206 can determine that features 201 do not satisfy conditions to be identified as an event. That is, the one or more features of normalized signal 122B do not alone provide sufficient evidence of an event. In one aspect, one or more single source probabilities assigned to normalized signal 122B do not satisfy probability thresholds in thresholds 226.

Method 300 includes receiving a second signal (304). For example, event detection infrastructure 103 can receive normalized signal 122A. Method 300 includes deriving second one or more features of the second signal (305). For example, event detection infrastructure 103 can derive features 202 of normalized signal 122A. Features 202 can include and/or be derived from time 123A, location 124A, context 126A, content 127A, type 128A, and source 129A. Event detection infrastructure 103 can also derive features 202 from one or more single source probabilities assigned to normalized signal 122A.

Method 300 includes aggregating the first one or more features with the second one or more features into aggregated features (306). For example, evaluation module 206 can aggregate features 201 with features 202 into aggregated features 203. Evaluation module 206 can include an algorithm that defines and aggregates individual contributions of different signal features into aggregated features. Aggregating features 201 and 202 can include aggregating a single source probability assigned to normalized signal 122B for an event type with a signal source probability assigned to normalized signal 122A for the event type into a multisource probability for the event type.

Method 300 includes detecting an event from the aggregated features (307). For example, evaluation module 206 can determine that aggregated features 203 satisfy conditions to be detected as an event. Evaluation module 206 can detect event 224, such as, for example, a fire, an accident, a shooting, a protest, etc. based on satisfaction of the conditions.

In one aspect, conditions for event identification can be included in thresholds 226. Conditions can include threshold probabilities per event type. When a probability exceeds a threshold probability, evaluation module 106 can detect an event. A probability can be a single signal probability or a multisource (aggregated) probability. As such, evaluation module 206 can detect an event based on a multisource probability exceeding a probability threshold in thresholds 226.

Figure 4:
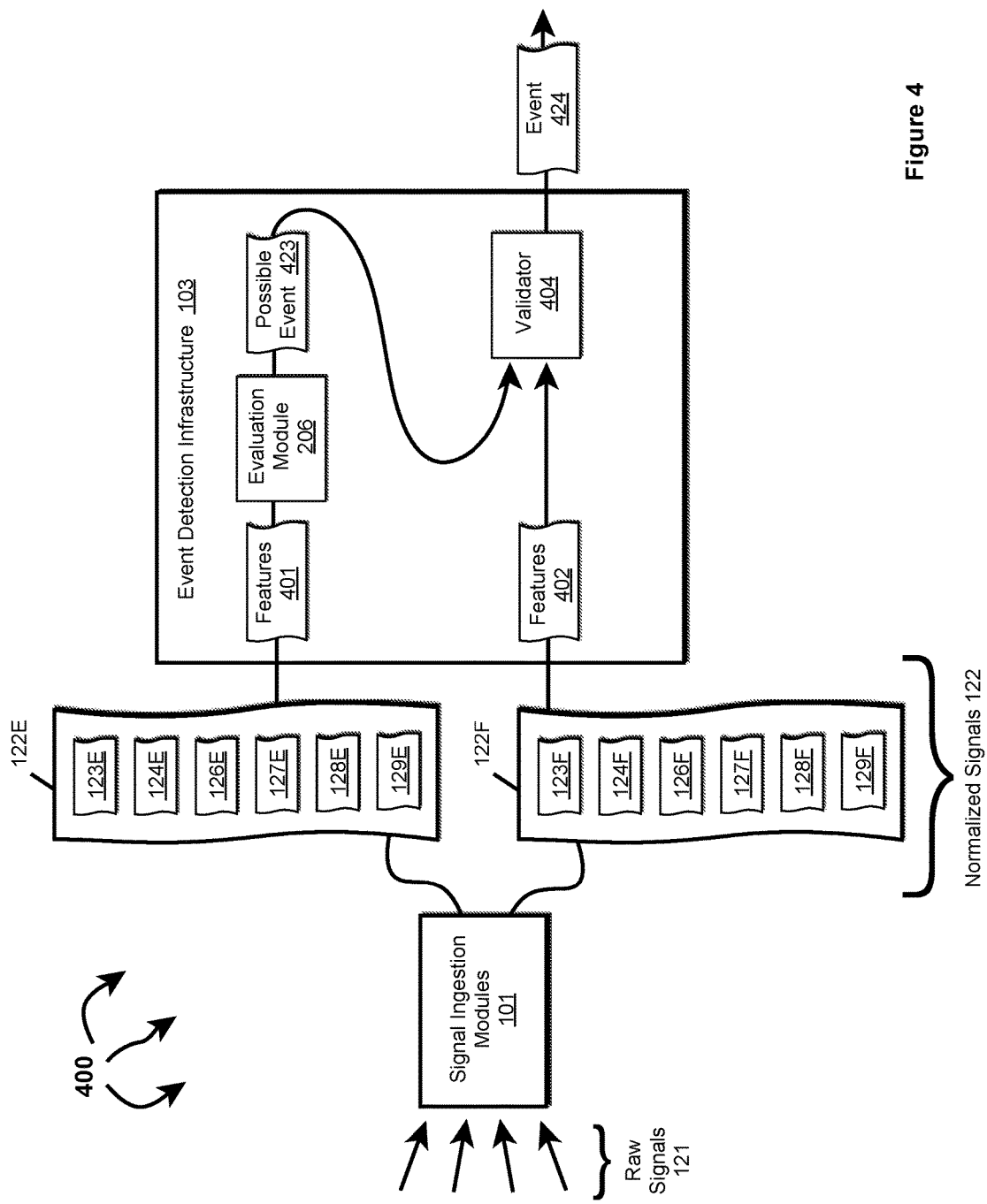
FIG. 4 illustrates an example computer architecture that facilitates detecting an event from features derived from multiple signals.

FIG. 4 illustrates an example computer architecture 400 that facilitates detecting an event from features derived from multiple signals. As depicted, event detection infrastructure 103 further includes evaluation module 206 and validator 404. Evaluation module 206 is configured to determine if features of a plurality of normalized signals indicate a possible event. Evaluation module 206 can detect (or not detect) a possible event based on one or more features (e.g., dimensions) of a normalized signal. Validator 404 is configured to validate (or not validate) a possible event as an actual event based on one or more features (e.g., dimensions) of another normalized signal.

Figure 5:
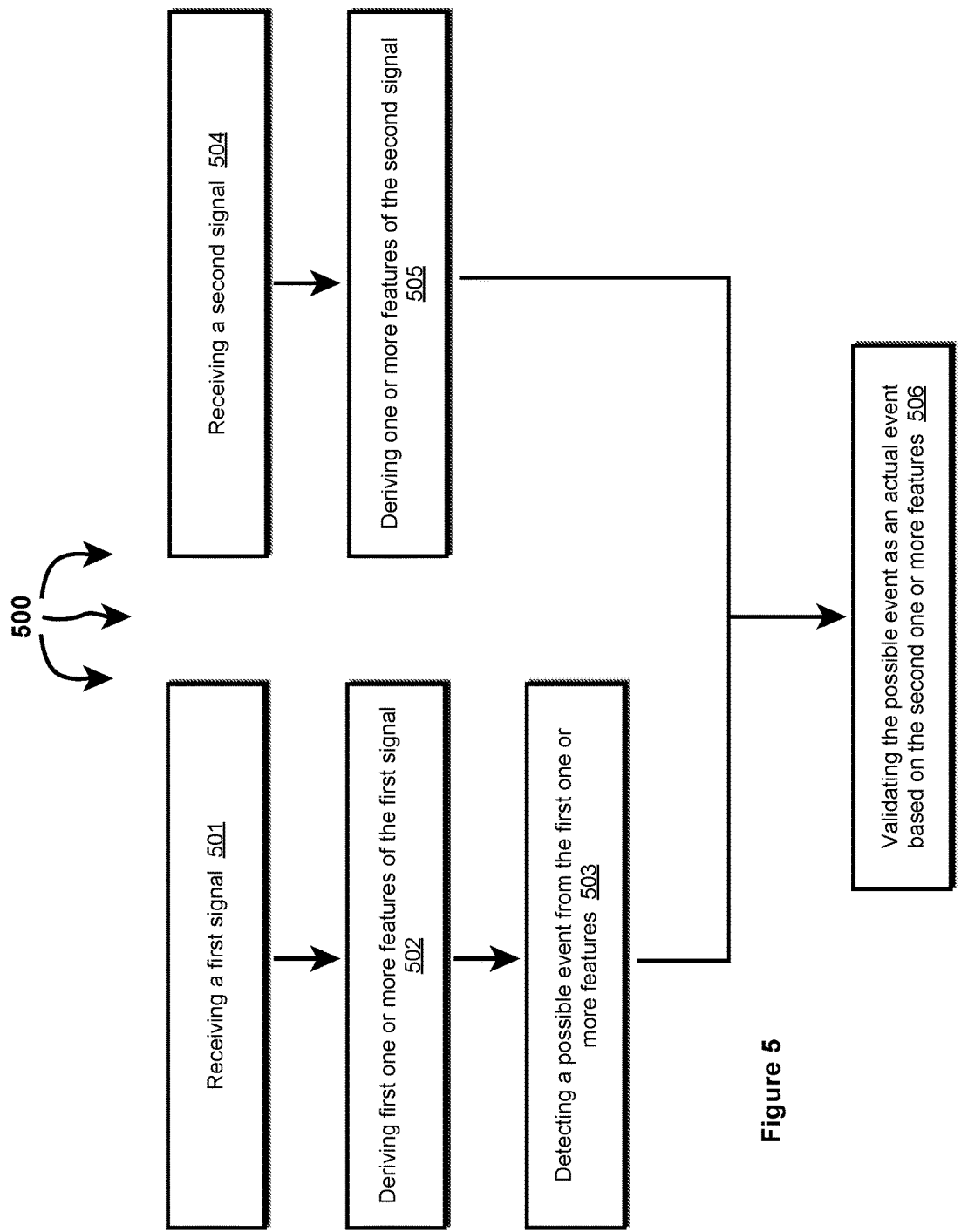
FIG. 5 illustrates a flow chart of an example method for detecting an event from features derived from multiple signals

FIG. 5 illustrates a flow chart of an example method 500 for detecting an event from features derived from multiple signals. Method 500 will be described with respect to the components and data in computer architecture 400.

Method 500 includes receiving a first signal (501). For example, event detection infrastructure 103 can receive normalized signal 122B. Method 500 includes deriving first one or more features of the first signal (502). For example, event detection infrastructure 103 can derive features 401 of normalized signal 122B. Features 401 can include and/or be derived from time 123B, location 124B, context 126B, content 127B, type 128B, and source 129B. Event detection infrastructure 103 can also derive features 401 from one or more single source probabilities assigned to normalized signal 122B.

Method 500 includes detecting a possible event from the first one or more features (503). For example, evaluation module 206 can detect possible event 423 from features 401. Based on features 401, event detection infrastructure 103 can determine that the evidence in features 401 is not confirming of an event but is sufficient to warrant further investigation of an event type. In one aspect, a single source probability assigned to normalized signal 122B for an event type does not satisfy a probability threshold for full event detection but does satisfy a probability threshold for further investigation.

Method 500 includes receiving a second signal (504). For example, event detection infrastructure 103 can receive normalized signal 122A. Method 500 includes deriving second one or more features of the second signal (505). For example, event detection infrastructure 103 can derive features 402 of normalized signal 122A. Features 402 can include and/or be derived from time 123A, location 124A, context 126A, content 127A, type 128A, and source 129A. Event detection infrastructure 103 can also derive features 402 from one or more single source probabilities assigned to normalized signal 122A.

Method 500 includes validating the possible event as an actual event based on the second one or more features (506). For example, validator 404 can determine that possible event 423 in combination with features 402 provide sufficient evidence of an actual event. Validator 404 can validate possible event 423 as event 424 based on features 402. In one aspect, validator 404 considers a single source probability assigned to normalized signal 122B in view of a single source probability assigned to normalized signal 122B. Validator 404 determines that the signal source probabilities, when considered collectively satisfy a probability threshold for detecting an event.

In another aspect, validator 404 compares dimensions of normalized signal 122E to dimensions of normalized signal 122F. When dimensions are sufficiently similar, validator 404 validates possible event 423 as event 424.

Validating Planned Events

In another aspect, a triggering signal indicates a possible planned event. The triggering signal may give some indication of context (e.g., who, what, where, when, how, etc.) around the planning of the possible planned event. A heuristic process can also derive context through reference to prior events detected at or near a location of the possible planned event.

Figure 6:
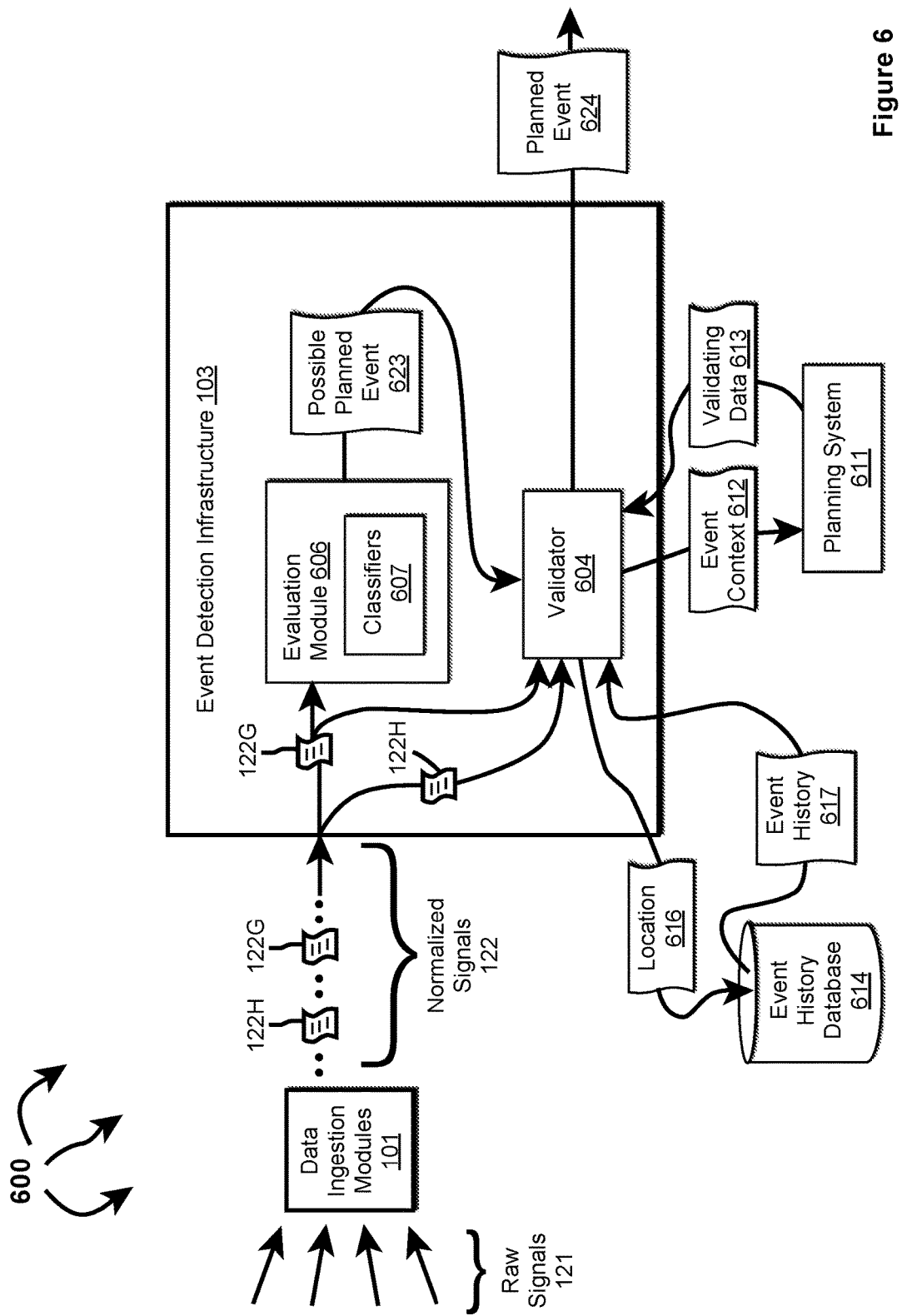
FIG. 6 illustrates an example computer architecture that facilitates validating planned events.

FIG. 6 illustrates an example computer architecture 600 that facilitates validating planned events. As described, data ingestion module(s) 101 can ingest raw signals 121 (e.g., social posts with geographic content (e.g., location), social posts without geographic content, traffic camera feeds, 911 calls, weather data, planned events, IoT device data, crowd sourced traffic and road information (e.g., Waze data), etc.). Data ingestion module(s) 101 can normalize raw signals 121 into normalized signals 122, including normalized signals 122G and 122H. Data ingestion module(s) 101 can send corresponding normalized signals 122 to event detection infrastructure 103.

Event detection infrastructure 103 can receive a plurality of normalized signals 122 from data ingestion module(s) 101. Event detection infrastructure 103 can route one or more normalized signals to evaluation module 606 (which can include functionality similar to evaluation module 206). For each normalized signal 122, evaluation module 306 can determine (e.g., by considering Time, Location, and Context dimensions) if one or more normalized signals possibly indicate a planned event. Classifiers 607 can include a classifier for each of multiple event categories, such as, for example, concert, protest, sporting event, etc. Evaluation module 606 can invoke a classifier 607 for each event category to determine if one or more normalized signals (either alone or collectively) satisfy specified requirements indicative of a possible planned event. When one or more normalized signals 122 (either alone or collectively) satisfy specified requirements of a classifier 607, the one or more normalized signals 122 are considered to indicate a possible planned event in the corresponding category.

In one aspect, event detection infrastructure 103 includes a signal scorer (not shown). The signal scorer can generate a score indicating the likelihood of a normalized signal indicating a possible event. Per normalized signal, the signal scorer can send the normalized signal and corresponding score to evaluation module 606. For each classifier 607, evaluation module 606 can determine if an individual score for a normalized signal or an aggregate score for a plurality of normalized signals (e.g., computed by aggregating one or more of Time, Location, and Context dimensions) satisfy a threshold.

Event detection infrastructure 103 can also route one or more normalized signals and detected possible planned events to validator 604 (which can include functionality similar to validator 404). Validator 604 can attempt to validate a possible planned event as an actual planned event in a specified event category based on characteristics (e.g., dimensions) of one or more normalized signals. In one aspect, evaluation module 606 detects a possible planned event based on characteristics (e.g., dimensions) of a first normalized signal. Validator 602 can perform one or more searches on content in a second normalized signal (e.g., names, keywords, places, etc.) and with a time at or near the time of the first normalized signal (e.g., computed from Time dimension comparison). Data returned from the one or more searches can be used to validate a possible planned event.

Evaluation module 606 and/or validator 604 can also derive (e.g., using artificial intelligence and/or machine learning) a location of a possible planned event from content of the first normalized signal and/or the second normalized signal (e.g., from Location dimensions). Event history 614 database (possibly included in geo cell database 111) can store a history of prior events detected at one or more locations (e.g., in areas bounded by one or more geo cells). Validator 604 can query event history database 614 for events at a specified location. Event history database 614 can return event history for the specified location to validator 604.

Validator 604 can use content (including dimensions) from one or more of: the first normalized signal, the second normalized signal, and returned event history to formulate an event context. From the event context, validator 604 can identify a (e.g., authoritative) planning system, that is potentially associated with the planned event. Validator 604 can query the planning system with the formulated event context.

In one aspect, there may be multiple different planning systems that plan different events. Validator 604 can query any number of the plurality of planning systems until an authoritative planning system is identified. For example, one or more additional planning systems in addition to planning system 611 can be included in computer architecture 600.

The planning system can attempt to identify an event associated with the formulated context that the planning system was involved in planning. The planning system can return validating data to validator 604. Validator 604 can use the validating data to validate a possible planned event as an actual planned event.

It may also be that validator 604 does not validate a possible event as an actual event. For example, there may be no event history for a location, a planning system may not return validating data, etc.

Figure 7:
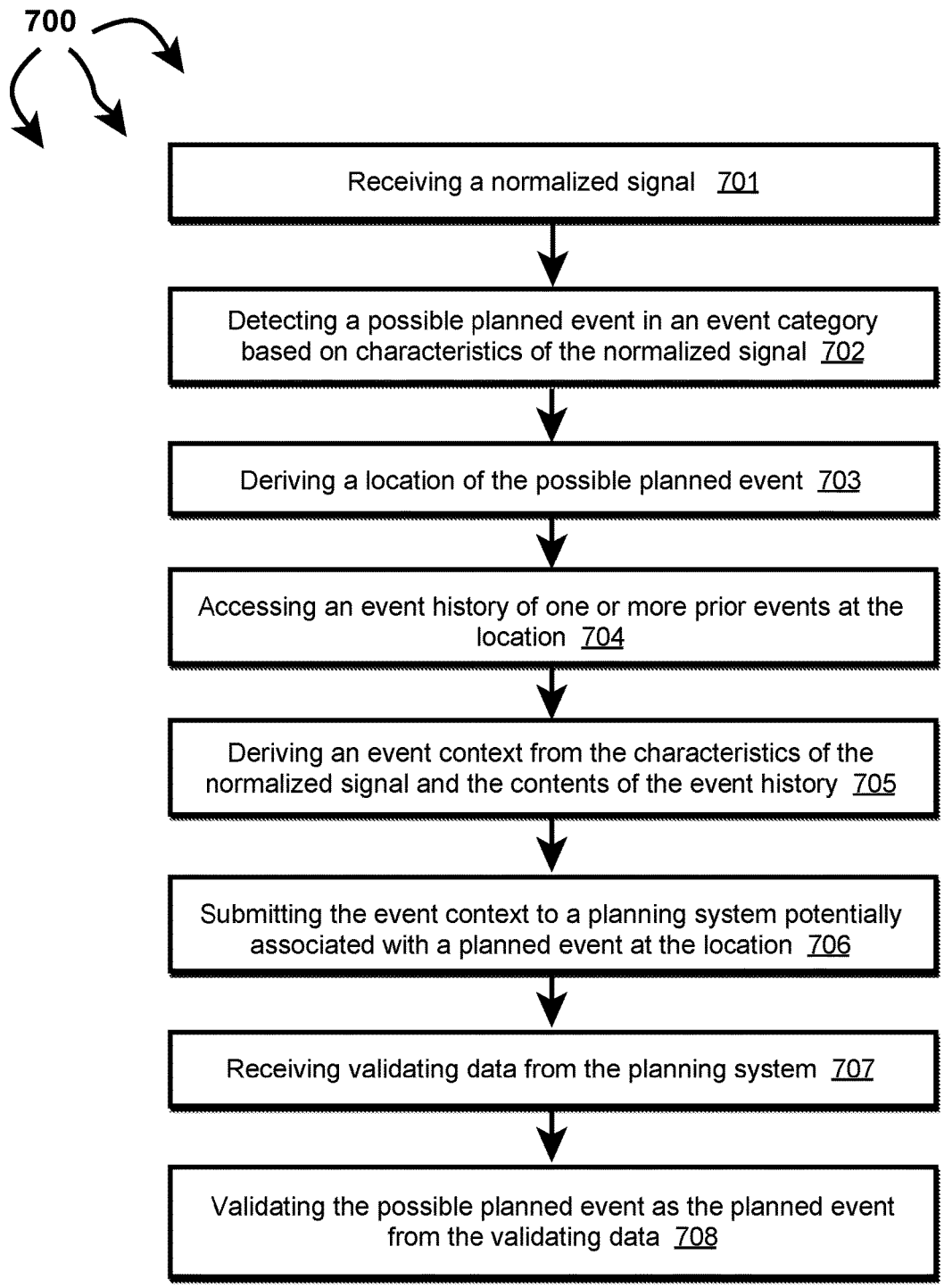
FIG. 7 illustrates a flow chart of an example method for validating a planned event.

FIG. 7 illustrates a flow chart of an example method 700 for validating a planned event. Method 700 will be described with respect to the components and data depicted in computer architecture 600.

As normalized signals are received at event detection infrastructure 103, the normalized signals can be routed to evaluation module 606 and/or routed to validator 604. For example, normalized signal 122G can be routed to evaluation module 606 and validator 604. Normalized signal 1223H can be routed to validator 604.

Method 700 includes receiving a normalized signal (701). For example, evaluation module 606 can receive normalized signal 122G. Method 700 includes detecting a possible planned event in an event category based on characteristics of the normalized signal (702). For example, a classifier 607 can detect possible planned event 623 in an event category (e.g., concert, protest, sporting event, etc.) based on characteristics (e.g., dimensions) of (or a computed score corresponding to) normalized signal 122G. Evaluation module 606 can send possible planned event 623 to validator 604.

Method 700 includes deriving a location of the possible planned event (703). For example, validator 604 (e.g., using artificial intelligence and/or machine learning) can derive location 616 of possible planned event 623 from the characteristics of normalized signal 122G, 122GH, etc. Validator 604 can also determine (e.g., through similarity in one or more of a Time dimension, a Location dimension, or a Context dimension) that normalized signal 122H is related to possible planned event 623. Validator 604 can derive location 616 from characteristics (e.g., a Location dimension) of normalized signal 122G and any related normalized signals, such as, normalized signal 122H.

Method 700 includes accessing an event history of one or more prior events at the location (704). For example, validator 604 can query event history database 614 with location 616. Event history database 614 can return event history 617 to validator 604. Event history 617 can indicate prior events that occurred at (or within) location 616. Method 700 includes deriving an event context from the characteristics of the normalized signal and the contents of the event history (705). For example, validator 604 can derive event context 612 (circumstances surrounding possible planned event 623) from the characteristics (e.g., dimensions) of normalized signal 122G (also possibly characteristics, for example, dimensions, of normalized signal 122H) and event history 617.

Method 700 includes submitting the event context to a planning system potentially associated with a planned event at the location (706). For example, validator 604 can determine that planning system 611 may have participated in the planning of an event at location 616. Validator 604 can submit event context 612 to planning system 611. Planning system 611 can determine if it planned an event having event context 612. For example, planning system 611 can determine that event context 612 is associated with planned event 624 and that planning system 611 was involved in planning planned event 624. As such, planning system 611 can formulate validating data 613 and can send validating data 613 to validator 604.

On the other hand, planning system 611 can determine that it did not participate in the planning of an event having event context 612. As such, planning system 611 indicates to validator 604 that it did not participate in the planning of possible planned event 623. In response, validator 604 can submit event context 612 to one or more other planning systems. Validator 604 can continue submitting event context 612 to other planning systems until a planning system sends validating data to validator 604.

Validator 604 may also have submitted event context 612 to one or more other planning systems prior to submitting event context 612 to planning system 611. Thus, validator 604 can query one or more other planning systems before and/or after querying planning system 611.

Method 700 includes receiving validating data from the planning system (707). For example, validator 604 can receive validating data 613 from planning system 611. Alternately, validator 604 can receive an indication from planning system 611 that it did not participate in the planning of possible planned event 623. Method 700 includes validating the possible planned event as the planned event from the validating data (708). For example, validator 604 can validate possible planned event 623 as (actual) planned event 624 based on validating data 613.

In one aspect, if planning system 611 does not return validating data, validator 604 sends event context 612 to another planning system. The other planning system can return validating data or can indicate it did not participate in planning of possible planned event 623. Validator 604 may send event context 612 to a specified number of planning systems prior to determining that possible planned event 623 is not validated.

Validator 604 may also continue to query additional planning systems even after validating data is received from a planning system. Validator 604 can compare validating data from multiple different planning systems. When validating data from different planning systems is consistent, validator 604 further validates a possible planned event as a planned event. When inconsistencies in validating data are identified, validator 604 can resolve inconsistencies by giving preference to validating data from particular planning systems that are more relevant. For example, for a hockey game, validator 604 can give preference to validating data from a hockey league website over validating data from a secondary ticket sales website. The league website may give a game start time while ticket sales web site indicates start time as the time parking is open (which could be many hours before the game starts).

Validating Planned Event Information and Changes

Figure 8:
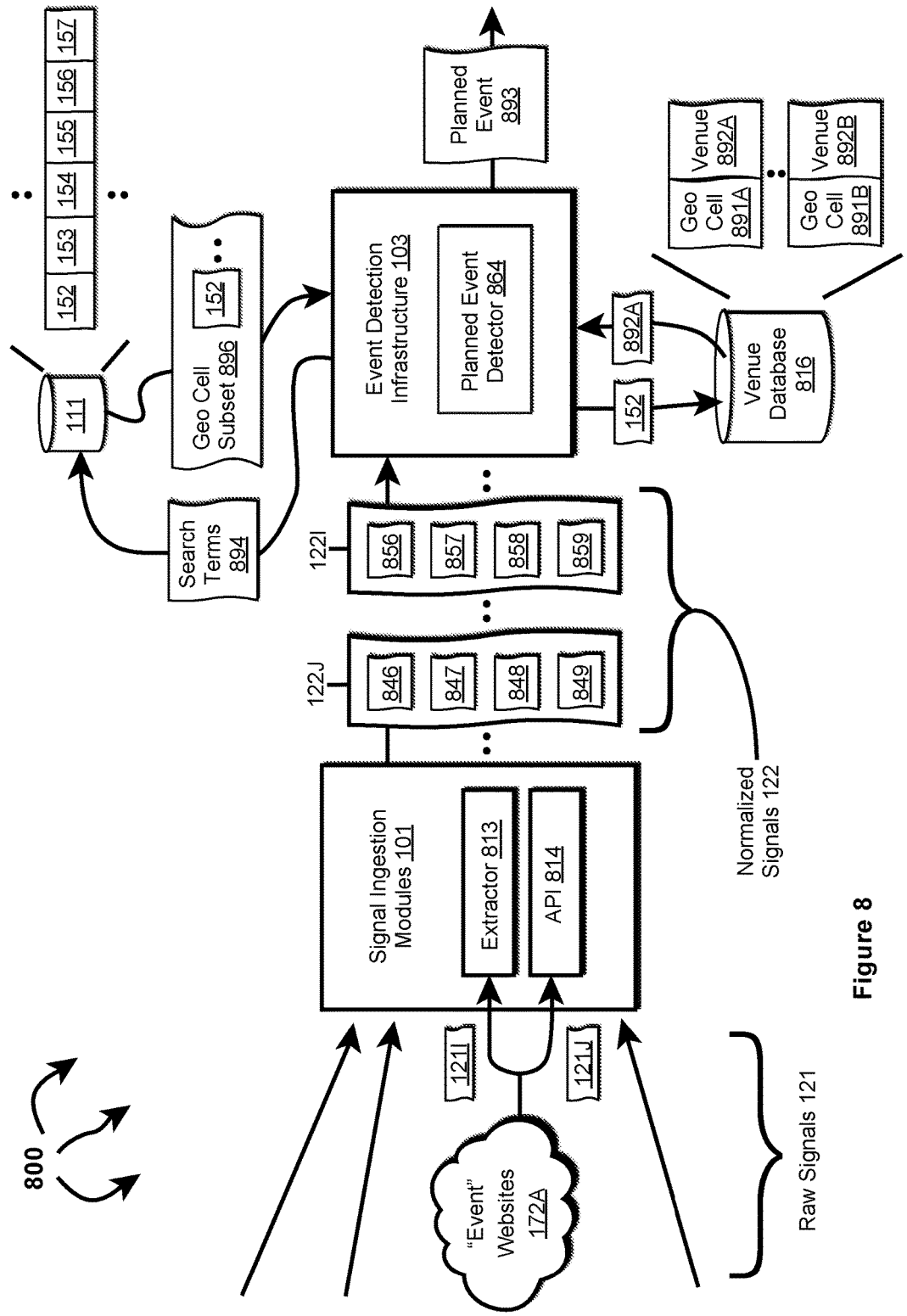
FIG. 8 illustrates an example computer architecture that facilitates detecting and validating planned event information.

In a further aspect, planned event information is received from multiple different sources. The planned event information and can be validated and discrepancies reconciled. FIG. 8 illustrates can example computer architecture 800 that facilitates detecting and validating planned event information.

As depicted in computer architecture 800, signal ingestion modules 101 can include extractor 813 and Application Programming Interface (API) 814. Extractor 813 and/or API 814 are configured to ingest raw signals from "Events" websites 172A (which are potentially included in Web signals 172). Extractor 813 can be more specifically configured to extract information from an Internet site that has been made available for general consumption. Raw signals ingested from "Events" websites 172A can include information related to planned events. Signal ingestion modules 101 can normalize raw signals including planned event related information into corresponding normalized signals and send the normalized signals to event detection infrastructure 103.

As depicted, event detection infrastructure 103 includes planned event detector 864. Planned event detector 864 which can interoperate with other modules of event detection infrastructure 103 to detect and characterize planned events and changes to planned events. Planned event detector 864 can include (e.g., machine learning, artificial intelligence, neural networks, etc.) modules that facilitate automated detection and validation of planned events and changes to planned events. The modules of planned event detector 864 can determine when multiple normalized signals are associated with the same planned event. The modules of planned event detector 864 can also determine when information (e.g., dimensions) in normalized signals concurs or disagrees with respect to the details (e.g., title, description, location, time, etc.) of a planned event.

In one aspect, modules of planned event detector 864 determine that different normalized signals concur with respect to details of planned event information. When different normalized signals concur, planned event detector 864 can validate a planned event. For example, planned event detector 864 can compare characteristics (including dimensions) of different normalized signals to one another. When the characteristics are sufficiently similar, planned event detector 864 determines that the normalized signals concur.

In another aspect, modules of planned event detector 864 determine that information in different normalized signals is inconsistent (e.g., by comparison). In response, the modules of planned event detector 864 derive search terms from information (e.g., dimensions) contained in the normalized signals. Event detection infrastructure 103 can query geo cell database 111 with the search terms. Geo cell database 111 can determine that the search terms match the contents of one or more geo cell entries. Geo cell database 111 can return a geo cell subset, including any matching geo cells, to event detection infrastructure 103.

Venue database 816 stores geo cell to venue mappings indicating venues included in a geo cell. For example, venue database 816 indicates that venue 192A is contained in an area defined by geo cell 191A, venue 192B is contained in area defined by geo cell 191B, etc. Event detection infrastructure 103 can query venue database 816 with geo cells contained in a geo cell subset. Venue database 816 can determine that a geo cell contained in a geo cell subset matches a geo cell corresponding to a venue. Venue database 816 can return a matching geo cell and corresponding venue to event detection infrastructure 103. Modules of planned event detector 864 can use the corresponding venue as the location of a planned event.

Modules of planned event detector 164 can query geo cell database 111 and venue database 816 to disambiguate between the same venue named differently (e.g., nicknames, official names, foreign language names, etc.). Modules of planned event detector 164 can also query geo cell database 111 and venue database 816 to account for changed venues, for example, venues closing, being renamed, and new venues opening.

Modules of planned event detector 164 can resolve other inconsistencies (e.g., using machine learning, artificial intelligence, neural networks, etc.), if any remain, in an automated fashion through reference to other databases. Inconsistencies unresolvable in an automated fashion can be forward to other resolution systems.

In one aspect, event detection infrastructure 103 draws a polygon on a map to indicate a venue location.

The resolution of geo cells in geo cell database 111 and venue database 194 can be sufficiently precise (e.g., geo hash level 7 or 8) so that similar venues side by side on the same block (e.g., different theaters) can be distinguished.

Figure 9:
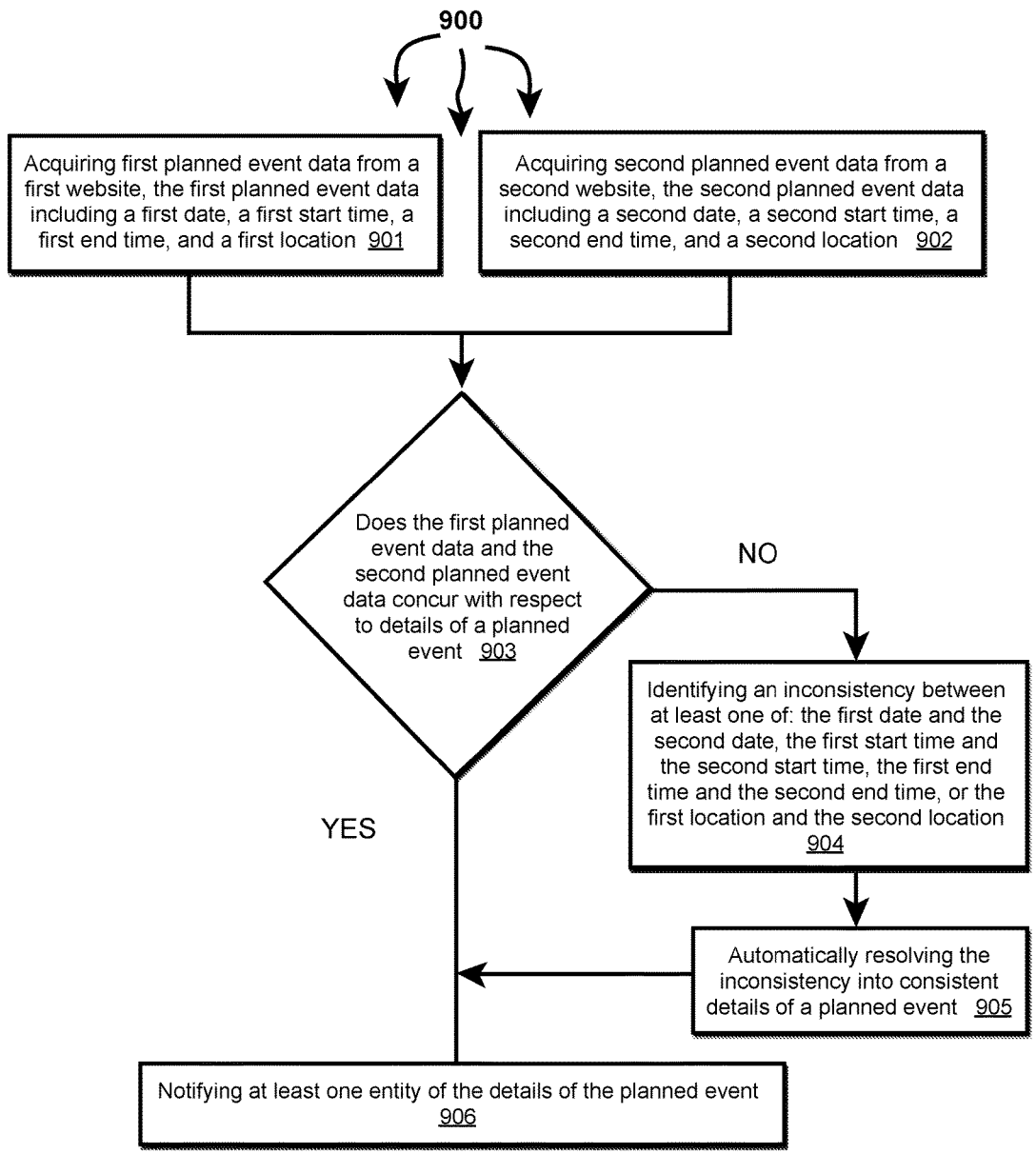
FIG. 9 illustrates a flow chart of an example method for detecting and validating planned event information.

FIG. 9 illustrates a flow chart of an example method 900 for detecting and validating planned event information. Method 900 will be described with respect to the components and data depicted in computer architecture 800.

Method 900 includes acquiring first planned event data from a first website, the first planned event data including a first date, a first start time, a first end time, and a first location (901). For example, extractor 813 and/or API 814 can acquire raw signal 121I from "Event" websites 172A. Signal ingestion modules 101 can normalize raw signal 121I into normalized signal 122I. Normalized signal 122I can include date 846, start time 847, and end time 848 (e.g., in a Time dimension) and location 849 (e.g., in a Location dimension) of a planned event.

Method 900 includes acquiring second planned event data from a second web site, the second planned event data including a second date, a second start time, a second end time, and a second location (902). For example, extractor 813 and/or API 814 can acquire raw signal 121J from "Event" websites 172A. Signal ingestion modules 101 can normalize raw signal 121J into normalized signal 122J. Normalized signal 122J can include date 856, start time 857, and end time 858 (e.g., in a Time dimension) and location 859 (e.g., in a Location dimension) of a planned event.

Method 900 includes determining if the first planned event data and the second planned event data concur with respect to details of a planned event (903). For example, planned event detector 864 can determine if planned event data in normalized signal 122I is consistent with planned event data in normalized signal 122J. That is, does date 846 concur with date 856, does start time 847 concur with state time 857, does end time 848 concur with end time 858, does location 849 concur with location 859, etc.? In one aspect, Time dimensions and/or Location dimensions of normalized signals 122I and 122J are compared. When sufficient similarity is detected, the signals are determined to concur.

When the first planned event data and the second planned event data do concur with respect to details of a planned event (YES at 903), method 900 includes notifying at least one entity of the planned event (or planned event change) (906). For example, planned event detector 864 can determine that date 846 does concur with date 856, start time 847 does concur with state time 857, does end time 848 does concur with end time 858, location 849 does concur with location 859, etc. Planned event detector 864 can detect event planned event 893 (or change to planned event 893) from normalized signals 122I, 122J, etc. (e.g., using mechanisms described with respect to computer architecture 600 and method 700). Event detection infrastructure 864 can send planned event 893 (or a change to planned event 893) to event notification 116.

When the first planned event data and the second planned event data do not concur with respect to details of a planned event (NO at 903), method 900 includes identifying an inconsistency between at least one of: the first date and the second date, the first start time and the second start time, the first end time and the second end time, or the first location and the second location (904). For example, planned event detector 864 can detect an inconsistency between one or of: dates 846 and 856, start times 847 and 857, end times 848 and 858, locations 849 and 859, etc. (e.g., through comparison of Time and/or Location dimensions).

Method 900 includes automatically resolving the inconsistency into consistent details of a planned event (905). For example, planned event detector 864 can automatically resolve inconsistencies in one or of: dates 846 and 856, start times 847 and 857, end times 848 and 858, locations 849 and 859, etc. into consistent details of a planned event. In one aspect, planned event detector 864 derives search terms 894 from the characteristics of normalized signals 122I, 122J, etc. (e.g., from phrases such as "112 Main St.", "at the corner of Elm and South Parkway", "in front of Oracle Arena"). Event detection infrastructure 103 queries geo cell database 111 with search terms 194. Geo cell database 111 can determine that search terms 894 match the contents of one or more geo cell entries. Geo cell database 111 can return one or more matching geo cells, including geo cell 152, to event detection infrastructure 103 in geo cell subset 896.

Event detection infrastructure can query venue database 816 with geo cell 152. Venue database can determine that geo cell 152 matches geo cell 891A. As such, venue database 816 can return venue 892A to event detection infrastructure 103. Planned event detector 864 can use venue 892A as a resolved location for planned event 893, addressing any inconsistency between locations 849 and 859.

Method 900 then includes notifying at least one entity of the details of the planned event (906). For example, event detection infrastructure can send planned event 893 (or a change to planned event 893) to event notification 116.

Modules of planned event detector 164 can resolve other inconsistencies, if any remain (e.g., between dates 846 and 856, between start times 847 and 857, between end times 848 and 858, etc.), in an automated fashion through reference to geo cell database 111 and other databases. Inconsistencies unresolvable in an automated fashion can be forwarded to other resolution systems.

Accordingly, an initial check for planned event data inconsistencies can be performed to determine if further planned event data resolution is appropriate. Planned event data resolution is performed when inconsistencies are detected. On the other hand, planned event data resolution data can be skipped when planned event data in different signals concurs with one another. Thus, an initial lower resource intensive inconsistency check can be performed to determine if more resource intensive data resolution is appropriate.

Validating Planned Event Occurrence and Auto Curating Content

Figure 10:
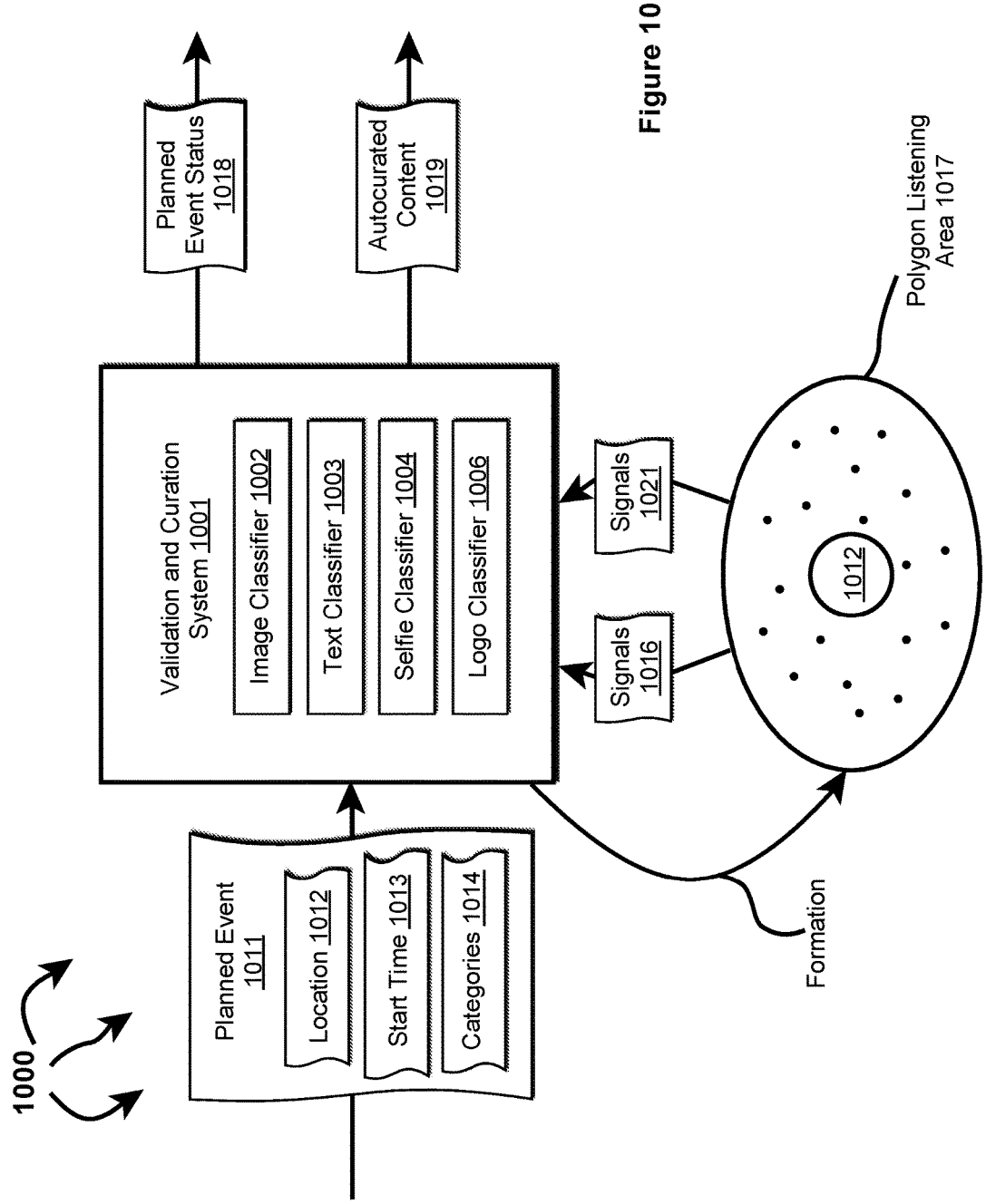
FIG. 10 illustrates an example computer architecture that facilitates validating occurrence of a planned event and auto curating content.

FIG. 10 illustrates an example computer architecture 1000 that facilitates validating occurrence of a planned event and auto curating content. As depicted, computer architecture 1000 includes validation and curation system 1001. Validation and curation system 1001 further includes image classifier 1002, text classifier 1003, selfie classifier 1004, and logo classifier 1006. In response to receiving an indication of a planned event, validation and curation system 1001 can form a polygon listening area around the location of the planned event some amount of time prior to the start time of the planned event. The polygon listening area can represent a geographic area at and around a planned event venue. A polygon listening area can be virtually any shape (square, rectangle, circle, oval, etc.) or any a series of connected line segments representing a closed area.

Validation and curation system 1001 can listen for signals in the polygon listening area. Image classification 1002 and text classification 1003 an process signals from the polygon listening area to determine if the signals are related to the planned event. When sufficient signal volume related to a planned event occurs in a polygon listening area within a specified time period, validation and curation system 1001 validates that the planned event is occurring. On the other hand, when insufficient signal volume related to a planned event is detected in a polygon listening area within a specified time period, validation and curation system 1001 determines that a planned event is not occurring.

When a planned event is validated, validation and curation system 1001 can continue to listen for signals in the polygon listening area. Signals can stream to validation and curation system during the planned event (e.g., during sporting event, convert, etc.). Image classifier 1002, text classifier 1003, selfie classifier 1004, and logo classifier 1006 can interoperate to auto curate a set of higher quality content (videos, images, text. etc.). The higher quality content can be broadcast worthy and tell a "good story" about the planned event. The higher quality content can be delivered to media customers (e.g., Television stations) for possible "on air" broadcasts. On the other hand, image classifier 1002, text classifier 1003, selfie classifier 1004, and logo classifier 1006 filter out lower quality content that is not delivered to media customers.

In one aspect, validation and curation system 1001 receives planned event 1011, including location 1012, start time 1013, and categories 1014. Validation and curation system 1001 forms polygon listening area 1017 around location 1012 some amount of time prior to start time 1013. Validation and curation system 1001 listens for signals in polygon listening area 1017 for a specified time period after formation. Validation and curation system 1001 can detect signals 1016 within the specified time period.

Validation and curation system 1001 can derive planned event status 1018 of planned event 1011 based on signals 1016. In one aspect, signals 1016 include a sufficient volume of signals related to planned event 1011 (e.g., to categories 1014). In response, validation and curation system 1001 validates planned event 1011 and continues to listen for signals in polygon listening area 1017. Validation and curation system 1001 indicates in planned event status 1018 that planned event 1011 is validated. In another aspect, signals 1016 include an insufficient volume of signals related to planned event 1011 (e.g., to categories 1014). In response, validation and curation system 1001 determines that planned event 1011 is not occurring and ceases listening for signals in polygon listening area 1017. Validation and curation system 1001 indicates in planned event status 1018 that planned event 1011 did not occur.

During planned event 1011, signals 1021 can stream to validation and curation system 1001. Image classifier 1002, text classifier 1003, selfie classifier 1004, and logo classifier 1006 can interoperate to auto curate content 1019 from signals 1021. Auto curated content 1019 can be broadcast worthy and tell a "good story" about planned event 1011.

Automating Planned Events Via a Human-Artificial Intelligence Feedback Loop

Some categories of planned events can be partially or fully automated. Automation can range from requiring fully human review to completely bypassing human review. A feedback loop permits a planned event detection system (e.g., integrated into event detection system 103) to learn from the decisions of automated reviewers and improve on its own. Depending on source and category of events, planned events can be fully automated, partially automated, or not automated. Sources and categories of planned events that are partially or fully automated can be audited on a periodic basis to insure accurate detections.

In one aspect, the mechanisms of computer architecture 800 and method 900 interoperate with the mechanisms of computer architecture 600 and method 700. A planned event detector can determine planned event data concurs across a plurality of normalized signals and/or can resolve any planned event data inconsistencies in an automated fashion. Evaluation module 606 and/or validator 604 can detect a planned event from concurring and/or resolved planned event data.

A unified interface included in signal ingestion modules 101 can handle incoming signals and content of any kind. The interface can handle live extraction of signals across dimensions of Time, Location, and Context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of changes to planned events happening globally. A data ingestion and event detection pipeline aggregates signals and combines detections of various strengths into truthful events. Thus, normalization increases event detection efficiency facilitating event change detection closer to "live time" or at "moment zero".

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
    ingesting a raw signal including a time stamp, an indication of a signal type, an indication of a signal source, and source data;
    applying a transform to re-code the source data and reduce the dimensionality of the raw signal into a Time, Location, Context (TLC) normalized signal including a Time dimension, a Location dimension, and Context dimension;
    detecting a possible planned event at a venue based on characteristics of the Time, Location, Context (TLC) normalized signal;
    validating the possible planned event as an actual planned event starting at an event start time based on validating data from an event planning system associated with the venue;
    forming a polygon listening area around the venue;
    initiating signal listening in the listening area at a specified time prior to the event start time;

computing a signal volume of additional ingested signals originating in the listening area and related to the planned event;
validating that the actual planned event is occurring based at least in part on the computed signal volume; and
notifying an entity that the actual planned event is occurring, the entity selected from among a person, a business entity, or a governmental entity.

2. The method of claim 1, wherein applying a transform to re-code the source data and reduce the dimensionality of the raw signal comprises applying a transform to re-code the source data and reduce the dimensionality of the raw signal, the raw signal selected from among: a social post with geographic content, an image from a traffic camera feed, a 911 call, weather data, IoT device data, satellite data, satellite imagery, a sound clip from a listening device, data from air quality sensors, a sound clip from radio communication, crowd sourced traffic information, or crowd sourced road information.

3. The method of claim 1, further comprising classifying the possible planned event in an event category.

4. The method of claim 1, wherein detecting a possible planned event at a venue comprises deriving the venue through reference to an event history database.

5. The method of claim 4, wherein deriving the venue through reference to an event history database comprises deriving the venue of through reference to a geo cell database.

6. The method of claim 1, wherein detecting a possible planned event based on characteristics of the Time, Location, Context (TLC) normalized signal comprises detecting a possible planned event based on the Context dimension.

7. A computer system comprising:
a processor;
system memory coupled to the processor and storing instructions configured to cause the processor to:
ingest a raw signal including a time stamp, an indication of a signal type, an indication of a signal source, and source data;
apply a transform to re-code the source data and reduce the dimensionality of the raw signal into a Time, Location, Context (TLC) normalized signal including a Time dimension, a Location dimension, and Context dimension;
detect a possible planned event at a venue based on characteristics of the Time, Location, Context (TLC) normalized signal;
validate the possible planned event as an actual planned event starting at an event start time based on validating data from an event planning system associated with the venue;
form a polygon listening area around the venue;
initiate signal listening in the listening area at a specified time prior to the event start time;
compute a signal volume of additional ingested signals originating in the listening area and related to the planned event;
validate that the actual planned event is occurring based at least in part on the computed signal volume; and
notify an entity that the actual planned event is occurring, the entity selected from among a person, a business entity, or a governmental entity.

8. The computer system of claim 7, further comprising instructions configured to cause the processor to classify the possible planned event in an event category.

9. The computer system of claim 7, wherein instructions configured to cause the processor to detect a possible planned event at a venue comprise instructions configured to cause the processor to derive the venue through reference to an event history database.

10. A method comprising:
normalizing a raw signal into a Time, Location, Context (TLC) normalized signal including applying a transform to re-code source data contained in the raw signal and to reduce the dimensionality of the raw signal into a Time dimension, a Location dimension, and Context dimension;
deriving an event context for a possible planned event from characteristics of the Time, Location, Context (TLC) normalized signal and an event history of one or more events previously detected at a venue;
validating the possible planned event as an actual planned event based on the event context, including:
acquiring first planned event data including a first date, a first start time, a first end time, and a first location;
acquiring second planned event data including a second date, a second start time, a second end time, and a second location;
identifying an inconsistency between at least one of: the first date and the second date, the first start time and the second start time, the first end time and the second end time, or the first location and the second location;
automatically resolving the identified inconsistency into consistent details of the actual planned event, including:
identifying a search term in one of: the first planned event data or the second planned event data;
referring to a geo cell database to identify a geo cell associated with the search term; and
using other information associated with the geo cell to resolve the inconsistency, including:
querying a venue database with the other information; and
receiving an indication of the venue from the venue database, the venue in a geographic area defined by the geo cell; and
notifying an entity of the actual planned event, the entity selected from among a person, a business entity, or a governmental entity.

11. The method of claim 10, wherein automatically resolving the identified inconsistency into consistent details of a planned event comprises using one or more of: machine learning, artificial intelligence, or neural networks to resolve the inconsistency into the consistent details.

12. A computer system comprising:
a processor;
system memory coupled to the processor and storing instructions configured to cause the processor to:
normalize a raw signal into a Time, Location, Context (TLC) normalized signal including applying a transform to re-code source data contained in the raw signal and to reduce the dimensionality of the raw signal into a Time dimension, a Location dimension, and Context dimension;
derive an event context for a possible planned event from characteristics of the Time, Location, Context (TLC) normalized signal and an event history of one or more events previously detected at a venue;
validate the possible planned event as an actual planned event based on the event context, including:
acquire first planned event data including a first date, a first start time, a first end time, and a first location;

acquire second planned event data including a second date, a second start time, a second end time, and a second location;

identify an inconsistency between at least one of: the first date and the second date, the first start time and the second start time, the first end time and the second end time, or the first location and the second location;

automatically resolve the identified inconsistency into consistent details of the actual planned event, including:
    identify a search term in one of: the first planned event data or the second planned event data;
    refer to a geo cell database to identify a geo cell associated with the search term; and
    use other information associated with the geo cell to resolve the inconsistency, including:
        query a venue database with the other information; and
        receive an indication of the venue from the venue database, the venue in a geographic area defined by the geo cell; and notify an entity of the actual planned event, the entity selected from among a person, a business entity, or a governmental entity.

13. The computer system of claim 12, wherein instructions configured to cause the processor to automatically resolve the identified inconsistency into consistent details of a planned event comprise instructions configured to cause the processor to use one or more of: machine learning, artificial intelligence, or neural networks to resolve the inconsistency into the consistent details.

14. The method of claim 1, wherein ingesting a raw signal comprises ingesting one of: a social signal, a web signal, or a streaming signal.

15. The computer system of claim 7, wherein instructions configured to cause the processor to ingest a raw signal comprise instructions configured to cause the processor to ingest one of: a social signal, a web signal, or a streaming signal.

16. The computer system of claim 7, wherein instructions configured to cause the processor to ingest a raw signal comprise instructions configured to cause the processor to extract information from an Internet site.

17. The method of claim 10, wherein normalizing a raw signal into a Time, Location, Context (TLC) normalized signal comprises normalizing one of: a social signal, a web signal, or a streaming signal into a Time, Location, Context (TLC) normalized signal.

18. The method of claim 10, wherein automatically resolving the identified inconsistency comprises:
    determining that the first planned event data is more relevant based on a planning system the first event data was acquired from; and
    giving preference to the first planned event data.

19. The computer system of claim 12, wherein instructions configured to cause the processor to normalize a raw signal into a Time, Location, Context (TLC) normalized signal comprise instructions configured to cause the processor to normalize one of: a social signal, a web signal, or a streaming signal into a Time, Location, Context (TLC) normalized signal.

20. The computer system of claim 12, wherein instructions configured to cause the processor to identify an inconsistency between at least one of: the first date and the second date, the first start time and the second start time, the first end time and the second end time, or the first location and the second location comprise instructions configured to cause the processor to compare at least one of: (a) the first date and the second date, (b) the first start time and the second start time, (c) the first end time and the second end time, or (d) the first location and the second location.

\* \* \* \* \*